O. N. CHASE.

Coal Sifter.

No. 42,273.

Patented April 12, 1864.

Witnesses:

Inventor:
Otis N. Chase

UNITED STATES PATENT OFFICE.

OTIS N. CHASE, OF BOSTON, MASSACHUSETTS.

IMPROVEMENT IN COAL-SIFTERS.

Specification forming part of Letters Patent No. 42,273, dated April 12, 1864.

*To all whom it may concern:*

Be it known that I, OTIS N. CHASE, of Boston, in the county of Suffolk and State of Massachusetts, have invented a new and Improved Coal Sifter and Hod Combined, for Sifting Coal and other Substances; and I do hereby declare that the following is a full, clear, and exact description of the construction and operation of the same, reference being had to the annexed drawings, of which—

Figure 1:
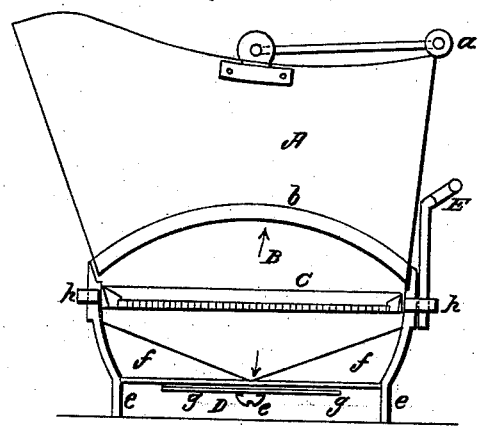
Figure 2:
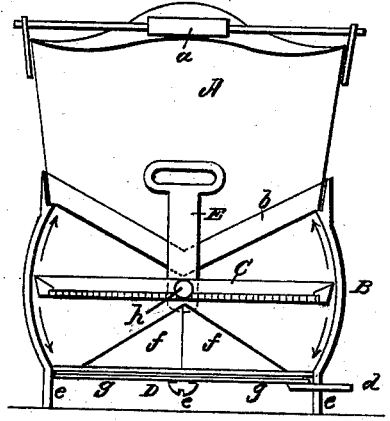

Figure 1 is a side sectional view; Fig. 2, a back sectional view; and Fig. 3 is a view of its bottom, letters of reference being used.

To enable others skilled in the art to make and use my invention, I will proceed to describe its construction and operation.

Figure 3:
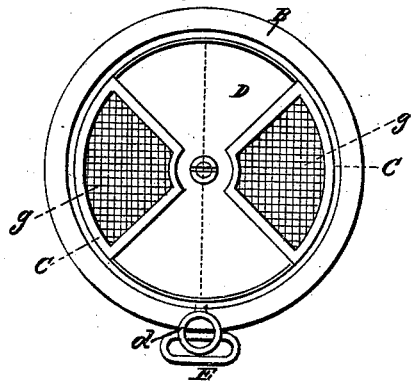

The frame B, Figs. 1, 2, and 3, which supports sieve C, is in the form of a thin hollow globe with a portion (which may be angular) of two opposite sides removed. Said sides constitute a top and bottom of the frame B. Around and near the upper edge of the frame B is the rim $b$, Figs. 1 and 2, to which the receptacle A, Figs. 1 and 2, may be attached. There is also a rim or support, $cc$, for the frame B at the bottom. The frame B is made of cast-iron or other suitable material, while the material of the receptacle A may be lighter. The sieve C is supported in the line of its axis upon bearings at $h h$, Figs. 1 and 2. The periphery of said sieve C nearly or quite touches the frame B around its inside lines in any position the sieve C may assume when properly attached to the frame B, as herein described. The lower edge of the sieve C may be narrowed from its upper edge around its circumference. (See Figs. 1 and 2.) Attached to the sieve C, in the line of its axis or otherwise, is the handle E, Figs. 1, 2, and 3, which answers a double purpose—first, for giving a vibrating or rocking motion to said sieve C and as a handle for elevation of the hod to empty it. Two separate handles may be used, but one is better. Across this sieve C there is attached in the line of its axis a thin narrow strip of iron, $x$, for the purpose of more effectually stirring up the material to be sifted when said sieve C is in operation. Beneath sieve C there is an outlet for the material that has passed through sieve C. It is constructed in the following manner and operated for the purpose above described: $ff$, Fig. 1, and $ff$, Fig. 2, are inclined planes attached to frame B for carrying to the outlets $g g$ the material that has passed through the sieve C. D, Figs. 1, 2, and 3, is a slide, which turns on a pivot or otherwise at the center, $e$, and is for the purpose of closing up the openings $g g$. It is opened and closed by the handle $d$, Figs. 2 and 3, which is attached to slide D. Said slide D in Figs. 1 and 2 represents the bottom closed. Fig. 3 represents the bottom when open. The inclined planes $ff$ may be differently arranged, and the slide D may be made to pull out, instead of rotating. There may be a cover attached to the receptacle A, if desirable.

The operation of the machine is as follows: The material to be sifted is put in at the top of the receptacle A (which may have its cover then closed, if constructed covered) and falls onto sieve C, the arrangement being placed over a dirt receptacle, the lower rim, $c c$, Figs. 1, 2, and 3, resting thereon. The handle $d$ is drawn one side, which opens the apertures $g g$. The handle E is then taken hold of by the operator and moved to and fro in the line of its oscillation, which imparts a rocking motion to the sieve C that stirs up the material within the receptacle A, so that the finer material will pass through sieve C and fall upon the inclined planes $ffff$, Figs. 1 and 2, and then slide down said inclined planes and out at the openings $g g$. The handle $d$ is then pushed back, which closes up the openings $g g$, so that dirt cannot pass through. The contents above the sieve C may be discharged from the top of the receptacle A by taking hold of the bail-handle $a$ (see Figs. 1 and 2) with one hand and elevating the lower part, the frame B, by the handle E with the other hand. The handle E may be constructed otherwise than as shown. The frame B may be otherwise than round in the line of its circumference, but must have sides curved in the line of the motion of the sieve C. The sieve C may be used with the strip $x$.

What I claim herein as of my own invention, and desire to secure by Letters Patent, is—

1. The rocking sieve C, when attached to frame B, with its sides curved in the line of the motion of the sieve, substantially as described.

2. The sieve C, in combination with the inclined planes $ff$ and the slide D, substantially as described, for the purpose set forth.

3. The handle E, when attached to the sieve C and fitted for the double purpose described, substantially as and for the purpose set forth.

OTIS N. CHASE.

Witnesses:
J. W. RICHARDSON,
DAVID C. RUDE.